United States Patent [19]

Kaneyuki

[11] Patent Number: 4,662,244
[45] Date of Patent: May 5, 1987

[54] ACCESSORY DRIVE DEVICE IN ENGINE

[76] Inventor: Kazutoshi Kaneyuki, c/o Mitsubishi Denki Kabushiki Kaisha, Himeji Works 840, Chiyodacho, Himeji-shi, Hyogo, Japan

[21] Appl. No.: 802,750

[22] Filed: Nov. 29, 1985

[30] Foreign Application Priority Data

Nov. 30, 1984 [JP] Japan .......................... 59-182908[U]

[51] Int. Cl.[4] ...................... F16H 17/06; F16H 15/50; F16H 15/16
[52] U.S. Cl. .................................. 74/752 B; 74/192; 74/606 A; 74/796
[58] Field of Search ...................... 74/191, 192, 752 B, 74/796, 606 A

[56] References Cited

U.S. PATENT DOCUMENTS

| | | | |
|---|---|---|---|
| 2,953,039 | 9/1960 | McRae | 74/796 X |
| 3,108,496 | 10/1963 | Kashihara | 74/796 |
| 3,108,497 | 10/1963 | Kashihara | 74/796 |
| 4,232,561 | 11/1980 | Kashihara et al. | 74/796 X |
| 4,346,624 | 8/1982 | Nagasaki et al. | 74/606 A X |
| 4,468,984 | 9/1984 | Castelli et al. | 74/191 X |

FOREIGN PATENT DOCUMENTS 58-86434  6/1983  Japan .
58-200838 11/1983 Japan .
59-22345  2/1984  Japan .
59-86455  6/1984  Japan .

Primary Examiner—Allan D. Herrmann

[57] ABSTRACT

A device which drives accessories such as an alternator or a cooling water pump utilizing output of an automobile engine, comprises an input shaft installed to an output shaft of the engine, a nonstage transmission with differential planetary mechanism of frictional transmission type installed between the shaft and a pulley connected to the accessory, a frictional transmission oil in an annular space enclosing the nonstage transmission, and forced cooling fans installed on both end plates of the pulley. Each forced cooling fan acts so that heat stored in the frictional transmission oil during the operation is effectively dissipated through the end plate to the outside. As a result, the transmission efficiency of the drive device is maintained at a high level.

3 Claims, 2 Drawing Figures

ACCESSORY DRIVE DEVICE IN ENGINE

BACKGROUND OF THE INVENTION

1. Field of the Invention

The present invention relates to a device to drive various accessories such as an alternator, a cooling water pump or the like, utilizing power of an engine of an automobile or the like.

2. Description of the Prior Art

In an engine of an automobile or the like, accessories such as an alternator, a cooling water pump, an air-conditioning compressor, an oil pump for hydraulic servo steering or the like are belt-driven by a crank pulley installed at the top end of a crank shaft. Since the accessory drive is accompanied with large power loss during the high speed running of the engine, in order to avoid it, various methods have been proposed that gear shifting of a crank pulley is performed with respect to the engine rotational speed and the running speed of the accessory is limited.

In FIG. 2 illustrating an accessory drive device having such speed limiting function in the prior art, numeral 1 designates an input shaft directly coupled to a crank shaft of an engine (not shown), numeral 2 an input transmission member on the input shaft, and numeral 3 a cam device for generating pressure interposed between the input shaft 1 and the input transmission member 2. Numeral 4 designates a plurality of planetary cones, each composed of a frictional transmission surface 4a on a conical surface, a frictional transmission surface 4b on a bottom surface of cone, and a frictional transmission surface 4c on a circumferential surface of cone axial line. Numeral 5 designates a gear shifting ring which is engaged in frictional engagement with the frictional transmission surface 4a of the planetary cone 4 and moved in the axial direction so as to vary the frictional transmission radius of the planetary cone 4, and numeral 6 designates an orbit ring which is engaged in frictional engagement with the frictional transmission surface 4c of the planetary cone 4 and, in its non-rotation state, guides the revolution of the planetary cone 4 around the axial line of the input shaft 1. Numeral 7 designates an accessory drive pulley, numeral 7a a plurality of key grooves on inner circumferential surface of the pulley 7 in the axial direction, and numeral 8 a roller key which transmits the rotational force of the gear shifting ring 5 to the pulley 7 and suppresses the movement in the axial direction and is engaged with the grooves 7a. Numerals 9, 10 designate end plates to support the pulley 7 at both ends. Numeral 11 designates a stationary plate which fixedly supports the orbit ring 6 and is fixed by a mounting part 11a to the stationary member of the engine (not shown). Numeral 12 designates a frictional transmission oil which acts as medium for the frictional transmission and fills the space closed by the pulley 7, the end plates 9, 10 and the input shaft 1. Numeral 13 designates a centrifugal governor comprising a centrifugal weight, a spring plate 13a which supports the centrifugal weight and connects it to the gear shifting ring 5, and a weight 13b attached to the free end. Numeral 14 designates a return spring.

Operation of the accessory drive device will be described. The rotational force of the crank shaft of the engine is transmitted to the input shaft 1, thereby the input transmission member 2 rotates through the cam device 3. The planetary cone 4 performs self-rotation on its own axial center, and at the same time performs the revolution around the axial center of the input shaft 1 along the frictional transmission surface of the orbit ring 6 which is a stationary element. The gear shifting ring 5 engaged in frictional engagement with the frictional transmission surface 4a of the planetary cone 4 is rotated around the axial center of the input shaft 1 on the basis of the differential action between the self-rotation and the revolution of the planetary cone 4 and the transmission radius ratio, and drives the pulley 7 through the roller key 8. The rotational speed ratio between the input shaft 1 and the gear shifting ring 5 can be arbitrarily set by moving the gear shifting ring 5 in the axial direction so that the effective radius ratio of the frictional transmission between the input shaft 1 and the gear shifting ring 5 is varied. For example, if the gear shifting ring 5 is engaged in frictional engagement at the large diameter side of the planetary cam 4, the rotational speed ratio becomes 1:1, and at the small diameter side, i.e., near vertex of the cone, the rotational speed ratio becomes 1:0.4—thus reduction at side of the transmission ring 5 can be selected in nonstage state. The centrifugal governor 13 controls the axial position of the gear shifting ring 5, and automatically controls the rotational speed of the pulley 7 to the speed ratio 1:1 at low speed state of the engine and to the nearly constant rotational speed when the engine is at intermediate or high speed state. The frictional transmission oil 12 is interposed in the frictional transmission surface and acts as medium for the frictional transmission force and performs lubrication and cooling in the contacting surfaces and the bearing.

The accessory drive device utilizing the nonstage transmission with the planetary mechanism of frictional transmission type as above described has a small size and large transmission capacity. However, the frictional transmission coefficient varies depending on temperature of the frictional transmission oil as the medium of the frictional transmission, and limitation of the transmission capacity and the transmission efficiency are significantly affected. In general, the relation between temperature of the frictional transmission oil and the frictional transmission coefficient and between limitation of the transmission capacity of such transmission and the transmission efficiency is apt to decrease if the temperature of the frictional transmission oil rises. While the engine in the automobile becomes of small size and light weight, since the engine space is narrowed in order to obtain the high input and enlarge the dwelling space of the car, temperature within the engine rises and hence temperature of the frictional transmission oil of the accessory drive device rises. Therefore, the device must be of large size to compensate the decrease of the transmission capacity and the transmission efficiency is decreased.

In order to eliminate above-mentioned disadvantages in the prior art, an object of the invention is to provide an accessory drive device which decreases the temperature rise of the frictional transmission oil and has small size and good transmission efficiency.

SUMMARY OF THE INVENTION

In one aspect of the invention, an accessory drive device of an engine is provided with forced cooling fans integral with end plates at both sides of the device in order to cool the frictional transmission oil as frictional cooling medium for the nonstage transmission with the differential planetary mechanism of frictional transmission type interposed in the transmission system from the input shaft to the accessory drive pulley.

Each of the forced cooling fans comprises a plurality of ribs or fan blades formed on an end plate and extending radially, and an annular disc installed on the top portion of each fan blade. These fan blades and disc constitute an air passage extending along the outside surface of the end plate from a portion near the rotation center to the periphery. While the pulley is rotated, air within the passage is forced in the radial direction by means of the centrifugal force and replaced by a fresh air taken from the end near the rotation center. Consequently, heat of the frictional transmission oil is effectively transferred. through the end plate to the air within the passage thereby the efficient cooling can be attained.

DETAILED DESCRIPTION OF THE PREFERRED EMBODIMENT

An embodiment of the invention will now be described referring to the accompanying drawings.

Figure 1:
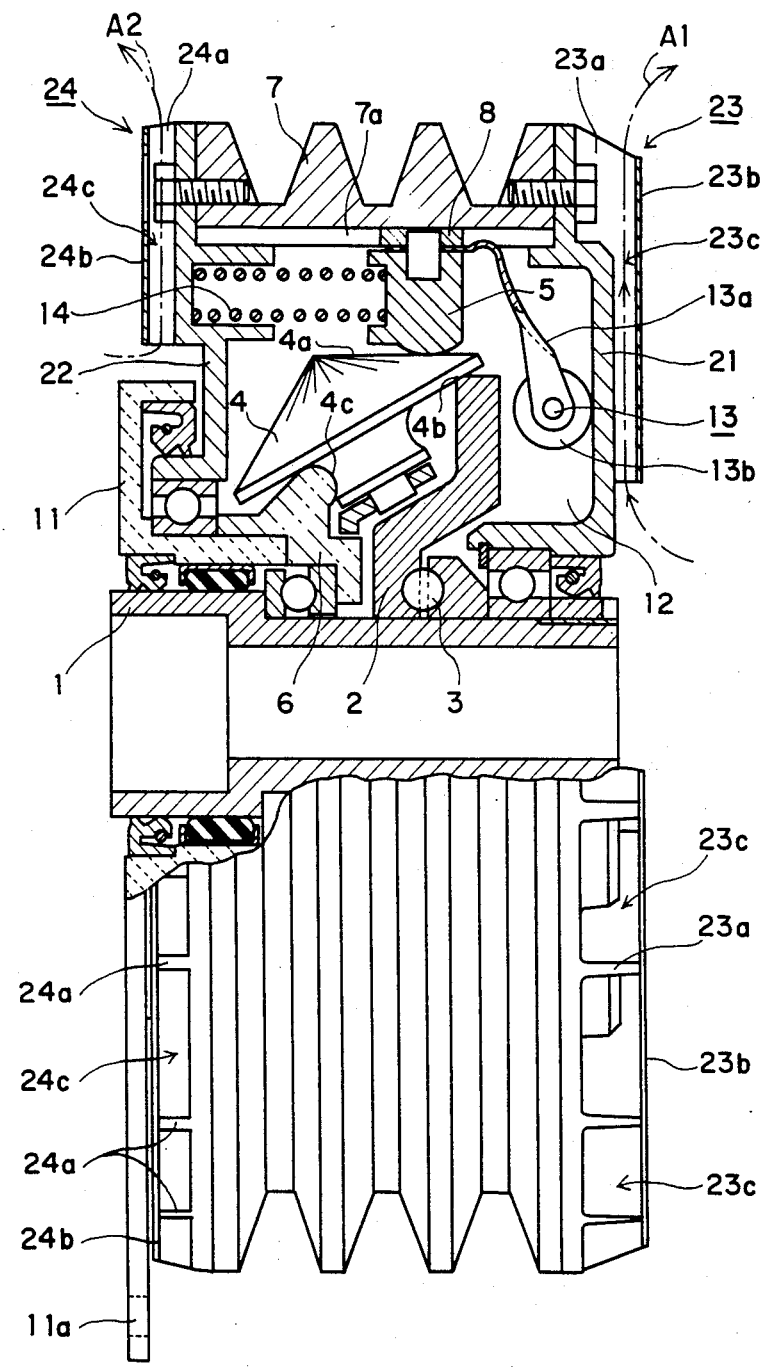
FIG. 1 is a side view of an accessory drive device of an engine according to the invention, partly cut away to show the inside thereof.
Figure 2:
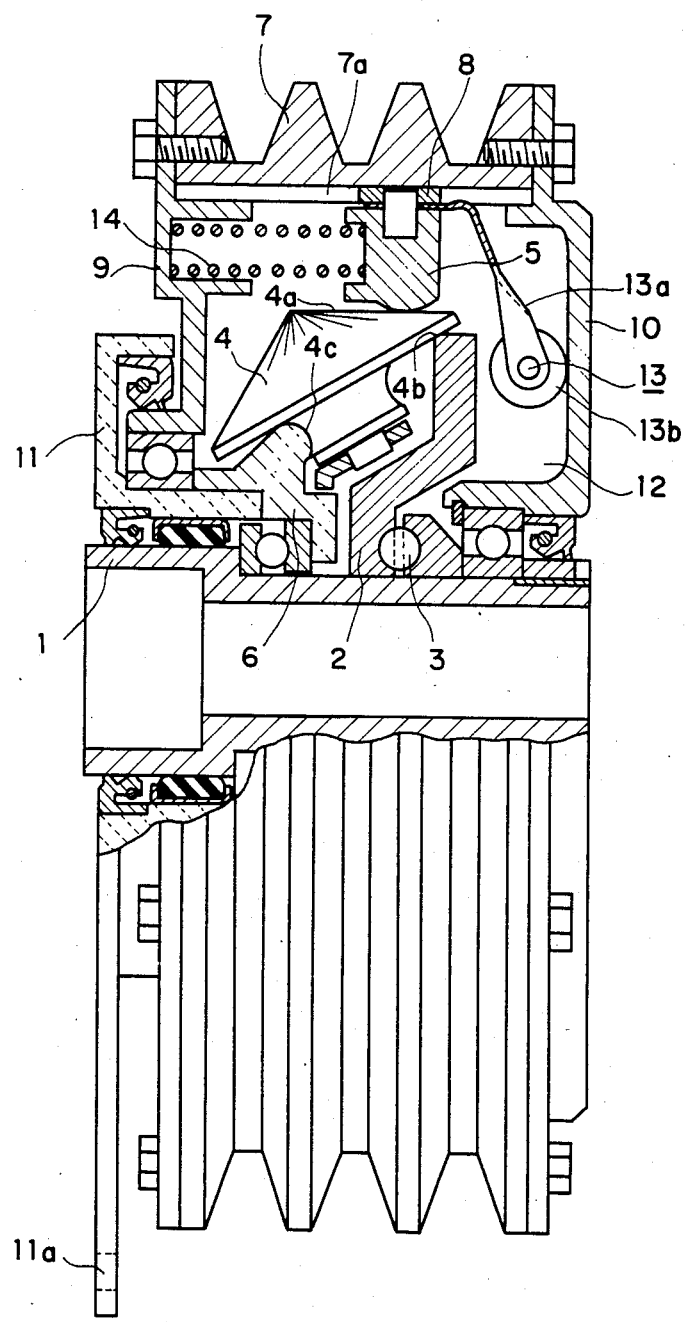
FIG. 2 is a side view of an accessory drive device of an engine in the prior art, partly cut away to show the inside thereof.

In FIG. 1, reference numeral 1 designates an input shaft, numeral 2 an input transmission member on the input shaft, and numeral 3 a cam device for generating pressure interposed between the input shaft 1 and the input transmission member 2. Numeral 4 designates a plurality of planetary cones, each composed of a frictional transmission surface 4a on a conical surface, a frictional transmission surface 4b on a bottom surface of cone, and a frictional transmission surface 4c on a circumferential surface of cone axial center. Numeral 5 designates a gear shifting ring which is engaged in frictional engagement with the frictional transmission surface 4a of the planetary cone 4 and moved in the axial direction so as to vary the frictional transmission ratio, and numeral 6 an orbit ring which guides the revolution of the planetary cone 4 around the axial line of the input shaft 1. Numeral 7 designates an accessory drive pulley, numeral 7a a plurality of key grooves on inner circumferential surface of the pulley 7 in the axial direction, and numeral 8 a roller key which transmits the rotational force of the gear shifting ring 5 to the pulley 7 and suppresses the movement in the axial direction and is engaged with the key grooves 7a. Numeral 11 designates a stationary plate which is fixed by a mounting part 11a to the stationary member of the engine (not shown). Numeral 12 designates frictional transmission oil acting as a medium for the frictional transmission, numeral 13 a centrifugal governor comprising a spring plate 13a and a weight 13b, and numeral 14 a return spring. Constitution and function of theses elements are substantially the same as those used in the device of the prior art shown in FIG. 2 and already described, and the detailed description shall be omitted here.

In order to support the pulley 7 rotatably on the input shaft 1, end plates 21 and 22 installed to both ends of the pulley 7 are provided, and end plates 21 and 22 are provided with forced cooling fans 23 and 24 respectively. The forced cooling fan 23 installed to one end plate 21 positioned on the right side in FIG. 1 comprises a plurality of ribs or fan blades 23a formed at outside surface of the end plate 21 and extending in the radial direction, and a disc 23b installed abutting on the top portion of the fan blades 23a and having a hole at the center. In this constitution, a plurality of air passages 23c extending in the radial direction are formed on the outside surface of the end plate 21, and one end of each air passage 23c is open at a position near the rotation center and other end thereof is open at a position remote from the rotation center. When each fan blade 23a is rotated at high speed together with the pulley 8, air in each passage 23c flows in the radial direction as shown in arrow A1 by means of the centrifugal force.

The other forced cooling fan 24 formed on the end plate 22 has a function similar to that of the forced cooling fan 23 as above described, and comprises a plurality of ribs or fan blades 24a and an annular disc 24b, whereby air passages 24c are constituted so that air flows in the direction shown by arrow A2 during the rotation.

As clearly seen from above-mentioned constitution, heat stored within the frictional transmission oil 12 contained in the closed space is transferred through the wall of the end plates 21, 22 to air within the passages 23c, 24c and discharged to the outside according to the air flow. The fan blades 23a, 24a serve to enlarge the effective area for the heat transfer between the end plates 21, 22 and the air.

Consequently, since temperature rise of the frictional transmission oil 12 can be reduced and decrease of the frictional transmission coefficient can be prevented, prescribed transmission capacity can be obtained and operation at high transmission efficiency can be maintained. In this case, although the power required to drive the forced cooling fans 20, 21 involves a loss in the device, increase of the transmission efficiency due to the temperature reduction of the transmission oil is large and the loss in the cooling fans is insignificant.

As above described, according to the invention, the forced cooling fans having also the radiating fin effect are installed integrally with the end plates of the accessory drive device utilizing the nonstage transmission with the planetary mechanism in the frictional transmission system; thereby the temperature rise of the frictional transmission oil can be reduced and the accessory drive device of the engine having small size and good transmission efficiency can be obtained.

What is claimed is:

1. A device which drives accessories such as an alternator, a cooling water pump, an air-conditioning compressor or the like, utilizing power taken from an output shaft of an engine, said device comprising:

an input shaft rotatably supported on a stationary member and receiving output from said output shaft and rotated at a rotational speed corresponding to that of said output shaft;

a transmission output member rotatably supported on said input shaft for transmitting the power to said accessories;

a planetary cone which can rotate on said input shaft in a revolution around the axial center of the input shaft and in self-rotation on an axial center inclined with respect to the axial center of the input shaft, said planetary cone having a first part of nearly conical shape, and a second part of nearly cylindrical shape leading to a bottom surface of the first part, and first, second and third frictional transmission surfaces being formed on the conical surface of the first part, the bottom periphery of the first part and the circumferential surface of the second part, respectively;

an input transmission member rotatable with said input shaft and engaged at its outer periphery in frictional engagement with the second frictional transmission surface of said planetary cone;

a support shaft of nearly cylindrical shape having a center hole through which said input shaft passes and arranged in conical relation to said input shaft and supported rotatable with respect to said stationary member;

an orbit ring fixedly supported to said support shaft, said orbit ring extending along the revolution path of said planetary cone and having an annular frictional engaging surface to be engaged in frictional engagement with the third frictional transmission surface of said planetary cone;

a gear shifting ring supported on said transmission output member and movable only in the axial direction thereof and having a frictional engaging surface engaged in frictional engagement with the first frictional transmission surface of said planetary cone always within the movable region in the axial direction;

a transmission ratio varying member for varying the position of said gear shifting ring in a direction to move toward or away from the rotation center of said planetary cone using the rotational speed of said transmission output member as a parameter and suppressing the rise of the rotational speed of said transmission output member in the range of the rotational speed of said input shaft larger than a prescribed value;

said transmission output member having two end plate members positioned on both ends thereof, said end plate members together with said input shaft constituting an annular closed space filled with a frictional transmission oil; and forced cooling fans installed on said end plate members.

2. A device as set forth in claim 1, wherein each forced cooling fan comprises a plurality of fan blades on the outside surface of the corresponding end plate member and extending in the radial direction, and an annular disc installed abutting the top portion of said fan blades.

3. A device as set forth in claim 1, wherein said fan blades are formed integrally with said end plate member.

* * * * *